(No Model.)
W. HOAG.
BALL BEARING.
No. 586,769. Patented July 20, 1897.
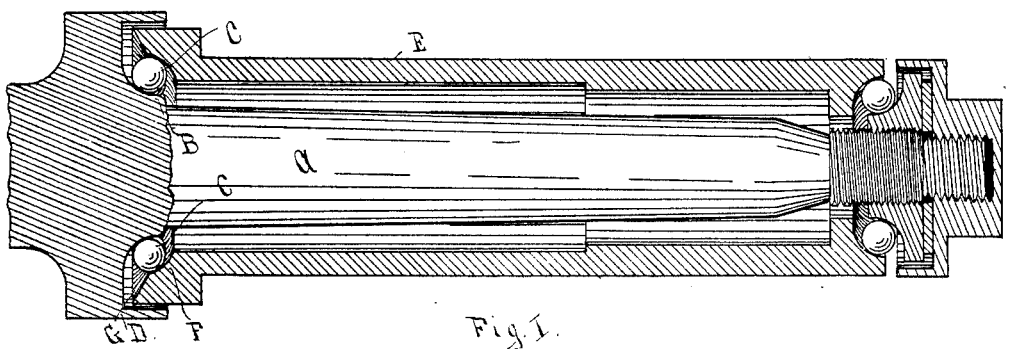
Fig. I.
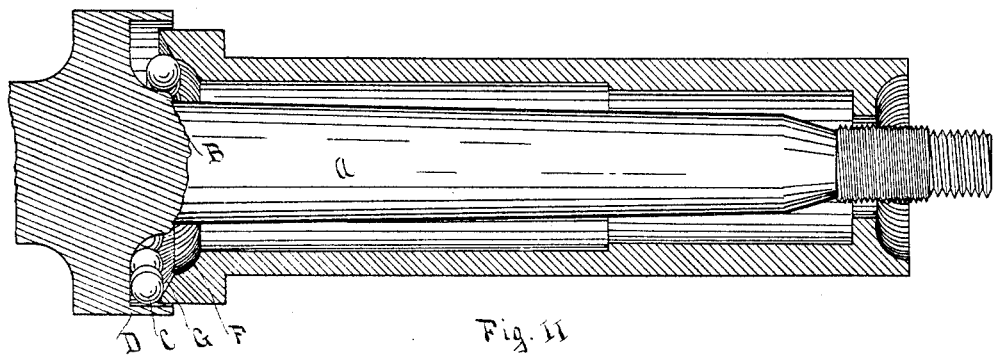
Fig. II.
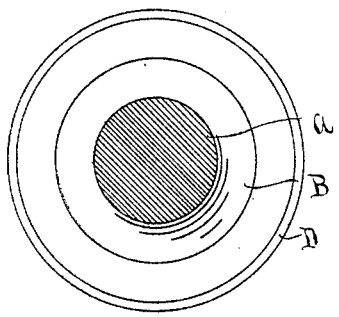
Fig. III.
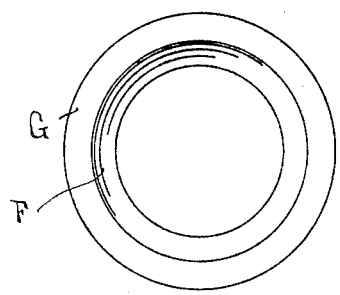
Fig. IV.
Witnesses:
E. R. Bosley.
Chas. M. Highson.
William Hoag, Inventor.
By his Attorney,
William Macomber.

UNITED STATES PATENT OFFICE.

WILLIAM HOAG, OF RIDGEWAY, NEW YORK.

BALL-BEARING.

SPECIFICATION forming part of Letters Patent No. 586,769, dated July 20, 1897.

Application filed December 7, 1896. Serial No. 614,862. (No model.)

*To all whom it may concern:*

Be it known that I, WILLIAM HOAG, a citizen of the United States, residing at Ridgeway, in the county of Orleans and State of New York, have invented certain new and useful Improvements in Ball-Bearings; and I do hereby declare the following to be a full, clear, and exact description of the invention, such as will enable others skilled in the art to which it appertains to make and use the same.

My invention relates to ball-bearings, and more particularly to means whereby the series of balls constituting the inner bearing upon an axle may be readily removed and replaced. As the axle, particularly when used in a horizontal position, as on carriages and wagons, cannot be readily changed to a vertical position the balls are removed and replaced with difficulty, and a simple means of effecting that end becomes necessary in the successful use of ball-bearings for such uses.

Referring to the drawings herewith, consisting of one sheet, in which like letters refer to like parts, Figure I is a longitudinal sectional view of my invention, showing the balls in place. Fig. II is a similar view showing my method of returning the balls to place. Figs. III and IV are respectively detail face views of the axle cone and cup and the sleeve and beveled face and cup-bearing.

As the outer set of balls and cone and cup or the balls and cone and cup adjacent to the nut, as shown in the drawings, are not directly involved in my invention the description is confined wholly to the inner set of balls and cone and cup.

A is the axle. B is the cone, secured thereto or integral with the axle A for the balls C.

D is the cylindrical cup.

E is the sleeve. F is the cup, integral therewith, which constitutes, with said cone B, the raceway for the balls C. The inner end of the sleeve is provided with an annular beveled face G, arranged outside of the cup-bearing F and adapted to engage with the balls when they are being inserted and to force them into place in the raceway, as hereinafter described.

The balls of the set at the outer end of the axle are put into place and removed in the ordinary manner. When they are removed and the sleeve E is slowly drawn from the axle A, the balls C fall out of the raceway, and by holding the hand under the cup D the balls are safely removed. When the balls are to be replaced, they are simply held in the palm of the hand and held up against the axle A adjacent to the cup D. The sleeve E is then slipped on, and the beveled face G will force the balls along from the hand up into the cylindrical cup D, as clearly shown in Fig. II. Then by forcing the sleeve E toward its place and at the same time giving it a slight rotation on the axle A the beveled face G, engaging upon the outer faces of the balls C, forces them inwardly from their position in the cup D to their proper place in the raceway. The outer set of balls being replaced in the ordinary manner the bearing is ready for use.

I do not limit my invention to an axle in a horizontal position, as my means for centering the balls within the raceway is of use in bearings occupying other than horizontal positions.

Having thus described my invention, I claim—

In a ball-bearing, the combination of the axle provided with a cylindrical cup and a cone constituting part of the raceway for the balls, a sleeve adapted to surround the axle, and provided with a cup F adapted to constitute the other part of the raceway, and an annular beveled face outside of the cup F, and the balls, substantially as set forth.

WILLIAM HOAG.

Witnesses:
LEON M. SHERWOOD,
E. S. SUTPHEN.